(12) United States Patent
Brinckman et al.

(10) Patent No.: US 11,503,009 B2
(45) Date of Patent: Nov. 15, 2022

(54) PASSWORD-LESS WIRELESS AUTHENTICATION

(71) Applicant: Cisco Technology, Inc., San Jose, CA (US)

(72) Inventors: Bart A. Brinckman, Nevele (BE); Eyal Shiber Shalev, Haifa (IL)

(73) Assignee: Cisco Technology, Inc., San Jose, CA (US)

( * ) Notice: Subject to any disclaimer, the term of this patent is extended or adjusted under 35 U.S.C. 154(b) by 271 days.

(21) Appl. No.: 16/856,773

(22) Filed: Apr. 23, 2020

(65) Prior Publication Data

US 2021/0336944 A1    Oct. 28, 2021

(51) Int. Cl.
*H04L 9/40*    (2022.01)
*H04W 12/069*    (2021.01)

(52) U.S. Cl.
CPC ........ *H04L 63/0807* (2013.01); *H04L 63/102* (2013.01); *H04L 63/205* (2013.01); *H04W 12/069* (2021.01)

(58) Field of Classification Search
CPC .. H04L 63/0807; H04L 63/102; H04L 63/205
See application file for complete search history.

(56) References Cited

U.S. PATENT DOCUMENTS

| | | | |
|---|---|---|---|
| 9,178,890 B1 | 11/2015 | Bhimanaik | |
| 9,537,661 B2 | 1/2017 | Khalil et al. | |
| 10,142,309 B2 | 11/2018 | Kaplan et al. | |
| 10,158,489 B2 | 12/2018 | Shastri et al. | |
| 2008/0016232 A1 | 1/2008 | Yared et al. | |
| 2014/0075513 A1* | 3/2014 | Trammel | H04L 63/0807 726/4 |
| 2015/0039444 A1* | 2/2015 | Hardin | H04L 67/02 705/14.69 |
| 2015/0039908 A1 | 2/2015 | Lee et al. | |
| 2015/0365399 A1* | 12/2015 | Biswas | H04L 63/0815 726/8 |
| 2017/0099281 A1 | 4/2017 | Trevathan et al. | |
| 2018/0255047 A1 | 9/2018 | Cicchitto | |
| 2019/0097802 A1 | 3/2019 | Rowe et al. | |
| 2021/0029100 A1* | 1/2021 | Bendersky | H04L 9/3231 |
| 2021/0037004 A1* | 2/2021 | Gordon | G06F 21/41 |
| 2021/0306320 A1* | 9/2021 | Squire | G06F 21/33 |

OTHER PUBLICATIONS

Notification of Transmittal of the International Search Report and the Written Opinion issued in International Application No. PCT/US2021/027610, dated Jul. 23, 2021, (14 pages).

* cited by examiner

*Primary Examiner* — William S Powers
(74) *Attorney, Agent, or Firm* — Merchant & Gould P. C.

(57) ABSTRACT

First, a plurality of access tokens may be received from a respective plurality of identity provider services. Each of the plurality of access tokens may be associated with a user. Then, the plurality of access tokens may be stored in a profile associated with the user. Next, user polices associated with the use of the plurality of access tokens may be assigned. A device token may then be provided to a user device associated with the user. The device token may be associated with the profile. The device token and network policies may be received and then it may be determined that the user polices and the network policies are congruent. In response to determining that the user polices and the network policies are congruent, authentication to at least one of the plurality identity provider services may be made.

20 Claims, 6 Drawing Sheets

PASSWORD-LESS WIRELESS AUTHENTICATION

TECHNICAL FIELD

The present disclosure relates generally to wireless authentication.

BACKGROUND

In computer networking, a wireless Access Point (AP) is a networking hardware device that allows a Wi-Fi compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home or school often required running many cables through walls and ceilings in order to deliver network access to all of the network-enabled devices in the building. With the creation of the wireless AP, network users are able to add devices that access the network with few or no cables. An AP normally connects directly to a wired Ethernet connection and the AP then provides wireless connections using radio frequency links for other devices to utilize that wired connection. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
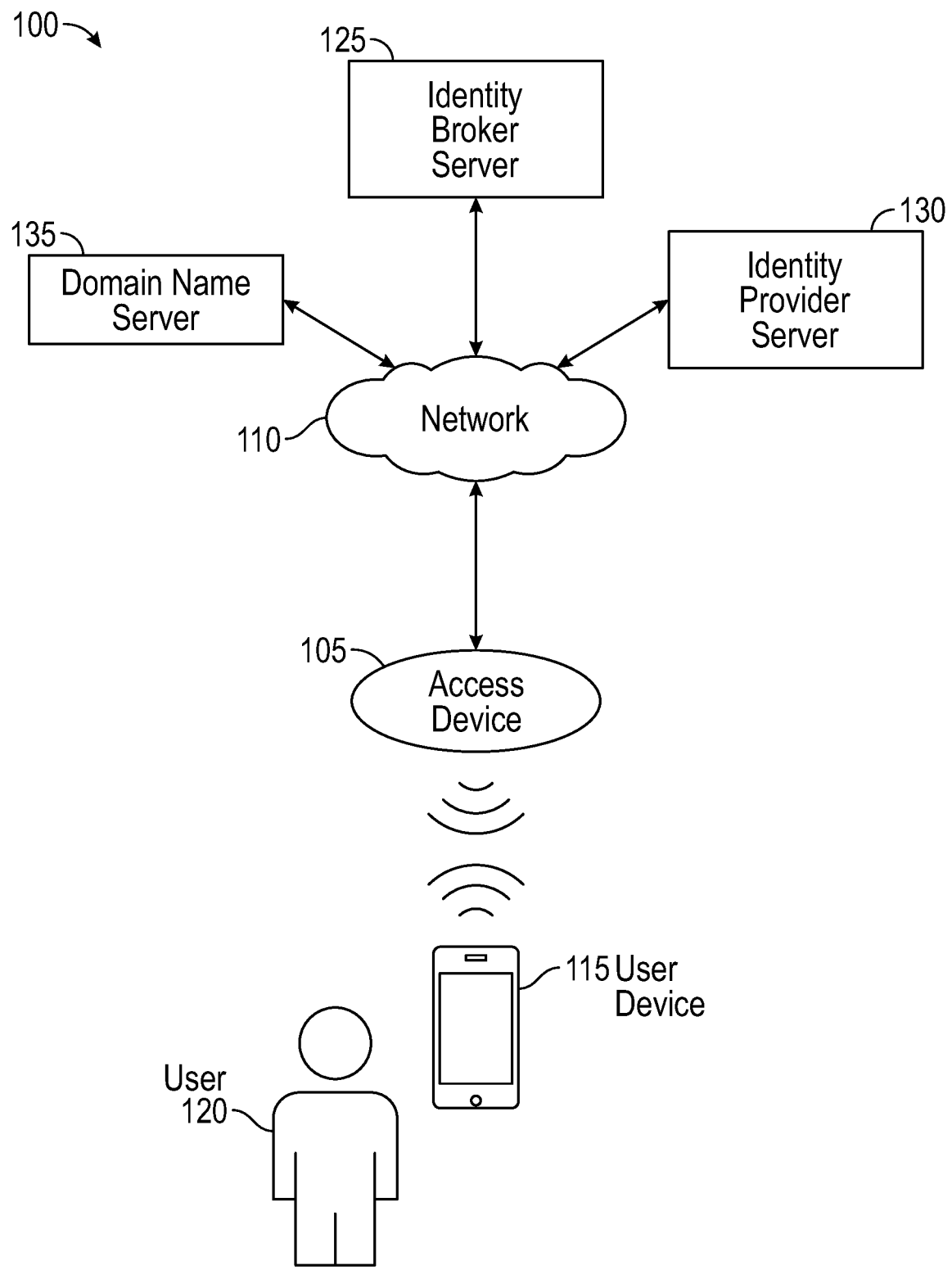
FIG. 1 is a block diagram of an operating environment for providing password-less wireless authentication.

First, a plurality of access tokens may be received from a respective plurality of identity provider services. Each of the plurality of access tokens may be associated with a user. Then, the plurality of access tokens may be stored in a profile associated with the user. Next, user polices associated with the use of the plurality of access tokens may be assigned. A device token may then be provided to a user device associated with the user. The device token may be associated with the profile.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Embodiments of the disclosure may provide a password-less and secure access to wireless networks leveraging identity provider services. For example, the identity provider services may comprise social media or web browser cloud-based identity provider services or enterprise identity provider services. The wireless networks may comprise, but are not limited to, Wi-Fi based networks, 4G based networks, or 5G based networks for example.

From a user perspective, the user may provision a set of identities it may be willing to use for wireless access. The user may also configure policies about which types of identities the user may be willing to divulge to service providers such as wireless service providers. In addition, the user may also define how much personal information (e.g., name, email address, and phone number) that may be shared with the wireless service provider.

From the wireless service provider perspective, the wireless service provider may configure what identities, or combination of identities, the wireless service provider may be willing to accept in their network and what minimum information about the user the wireless service provider may require from the user. For example the wireless service provider may accept a combination of two verified cloud provider identities or an enterprise identity. The wireless service provider may further require an email address in order to connect the user. Notwithstanding, embodiments of the disclosure may provide seamless wireless access by matching user policies with wireless service provider policies.

Accordingly, embodiments of the disclosure may provide password-less access to a resource, for example, a network resource (e.g., a wireless network). This access may not be based on a single credential, but instead may be based on a profile comprising multiple credentials with policies attached to them as to where they may be permitted to be used and how. The profile may not contain any actual credentials or Personally Identifiable information (PII), but instead may contain access tokens from the actual credential holders that may allow an identity broker service to authenticate against their Application Program Interfaces (APIs). As such, this service may not use any specific PII.

FIG. 1 shows a block diagram of an operating environment 100 for providing password-less wireless authentication. As shown in FIG. 1, operating environment 100 may comprise an access device 105, a network 110, a user device 115 operated by a user 120, an identity broker server 125, an identity provider server 130, and a Domain Name Server (DNS) 135.

In some embodiments of the disclosure, access device 105 may comprise a Wi-Fi Access Point (AP) configured to support a wireless (e.g., Wi-Fi) hotspot. The Wi-Fi hotspot may comprise a physical location where user 120, operating user device 115, may obtain access to network 110 (e.g., Internet access), using Wi-Fi technology, via a Wireless Local Area Network (WLAN) using a router connected to a service provider.

In other embodiments of the disclosure, access device 105 may comprise a device that may be connected to a cellular network that may communicate directly and wirelessly with end use devices (e.g., user device 115 operated by user 120) to provide access to network 110 (e.g., Internet access). For example, access device 105 may comprise, but is not limited to, an eNodeB (eNB) or a gNodeB (gNB). The aforementioned cellular network may comprise, but is not limited to, a Long-Term Evolution (LTE) broadband cellular network, a Fourth Generation (4G) broadband cellular network, or a Fifth Generation (5G) broadband cellular network, operated by a service provider.

User device 115 may comprise, but is not limited to, a smartphone, a tablet device, a personal computer, a mobile device, a cellular base station, a telephone, a remote control device, a set-top box, a digital video recorder, a cable modem, a network computer, a mainframe, a router, or other similar microcomputer-based device capable of accessing and using a Wi-Fi network or a cellular network. Network 110 may comprise, for example, the Internet.

Identity broker server 125 may provide password-less access to a resource, for example, a network resource (e.g., a wireless network). As will be described in greater detail below, consistent with embodiments of the disclosure, this provided access may not be based on a single credential, but instead may be based on a profile comprising multiple credentials with policies attached to them as to where they may be permitted to be used and how they may be permitted to be used.

Identity provider server 130 may create, maintain, and manage identity information for principals (i.e., users such as user 120) while providing authentication services to relying applications within a federation or distributed network. Identity providers may offer user authentication as a service. Relying party applications, such as web applications, may outsource the user authentication step to a trusted identity provider. For example, identity provider server 130 may be operated by a social media or web browser cloud-based identity provider service or enterprise identity provider service. While FIG. 1 shows one identity provider server 130, embodiments of the disclosure may include a plurality of identity provider servers respectively operated by a plurality of identity provider services.

The Internet may maintain two principal namespaces: a domain name hierarchy and an Internet Protocol (IP) address system. A domain name system maintains the domain name hierarchy namespace and provides translation services between these two namespaces. Internet name servers, such as DNS 135, may implement the domain name system. For example, DNS 135 may translate (i.e., resolve) human-memorable domain names and hostnames into the corresponding numeric IP addresses, the second principal name space of the Internet which is used to identify and locate computer systems and resources on the Internet.

The elements described above of operating environment 100 (e.g., access device 105, user device 115, identity broker server 125, identity provider server 130, and domain name server 135) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 6, the elements of operating environment 100 may be practiced in a computing device 600.

Figure 2:
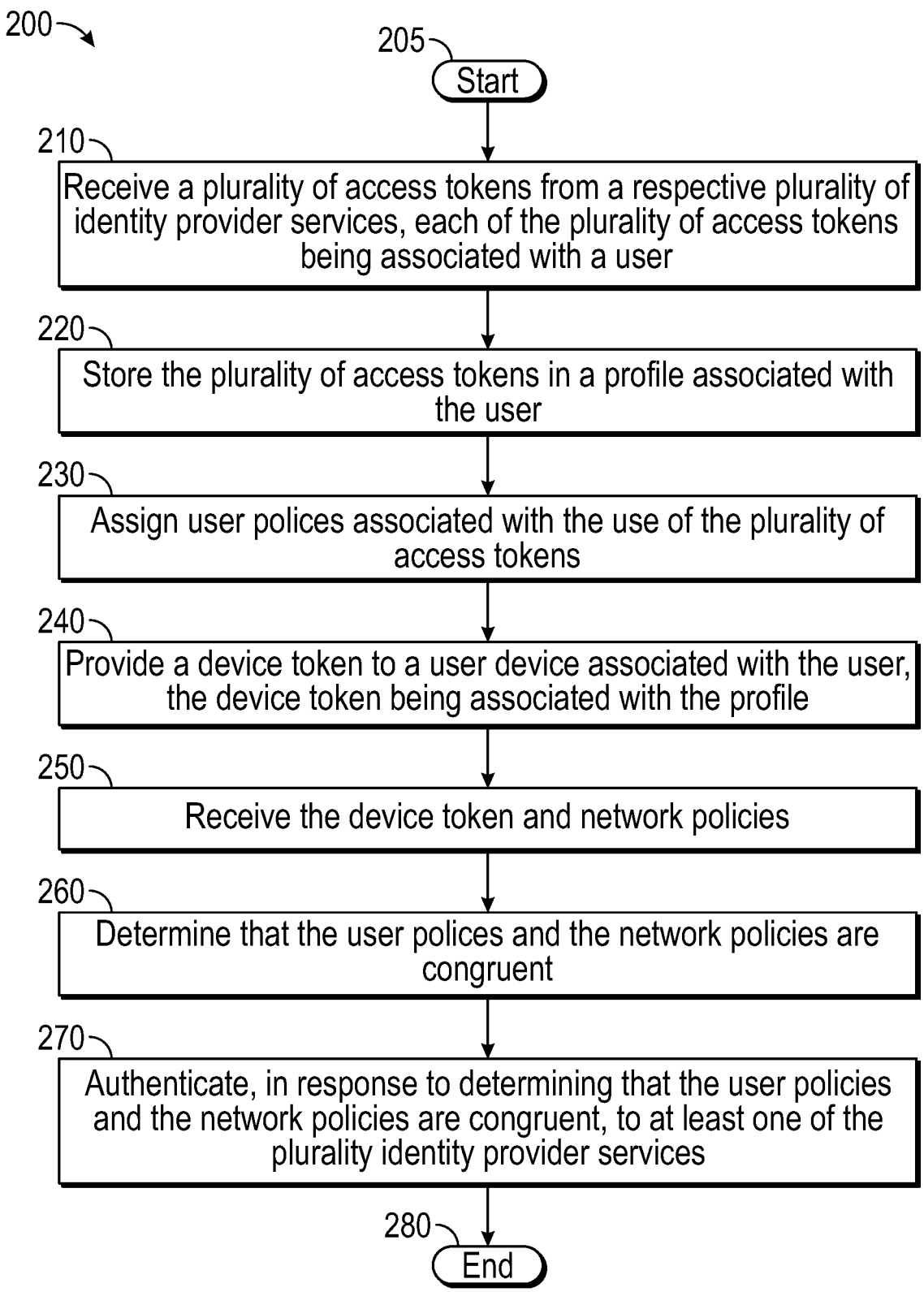
FIG. 2 is a flow chart of a method for providing password-less wireless authentication.

FIG. 2 is a flow chart setting forth the general stages involved in a method 200 consistent with an embodiment of the disclosure for providing password-less wireless authentication. Method 200 may be implemented using identity broker server 125 as described in more detail above with respect to FIG. 1, which may be implemented by a computing device 600 as described in more detail below with respect to FIG. 6. Ways to implement the stages of method 200 will be described in greater detail below.

Figure 3:
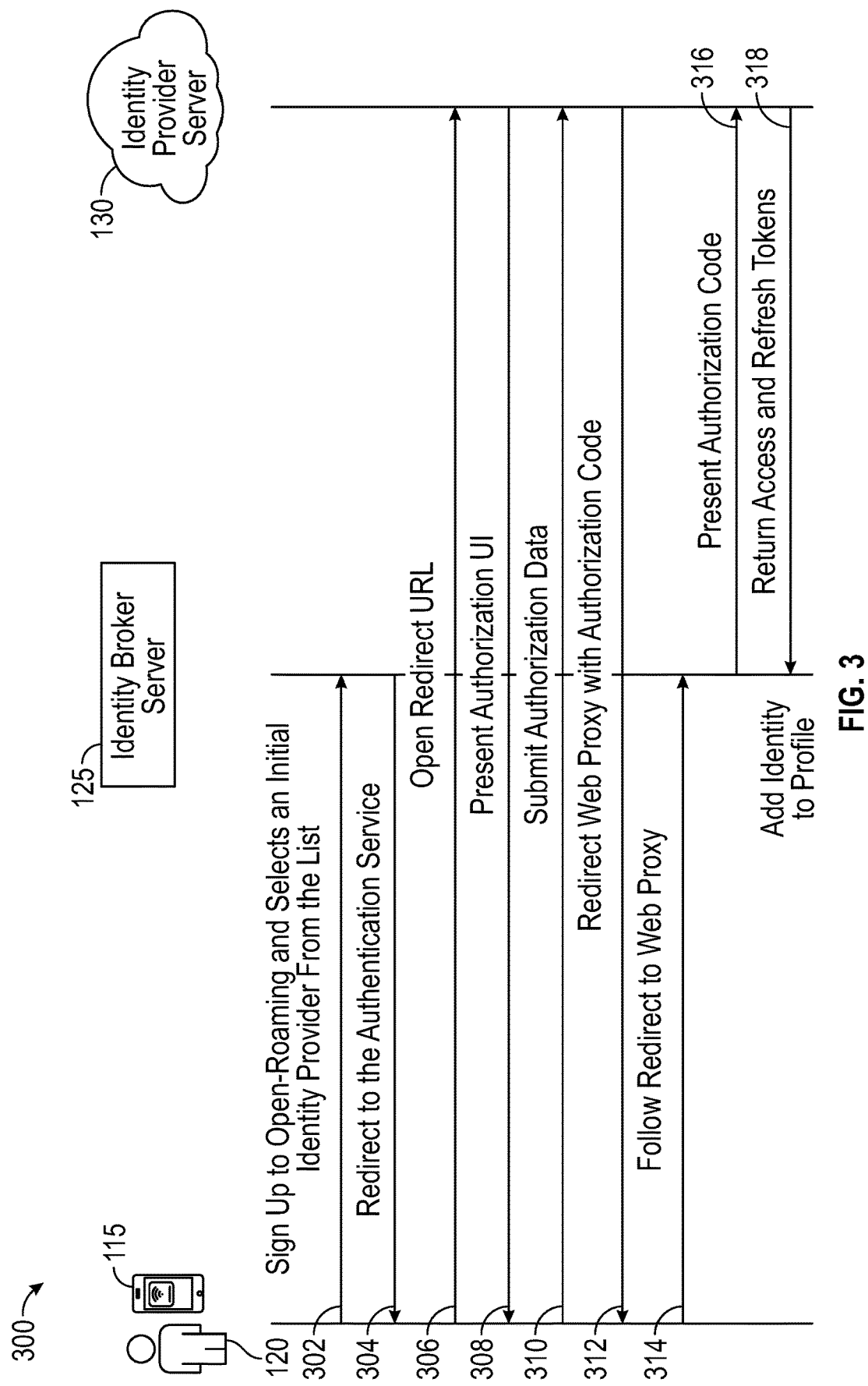
FIG. 3 illustrates a process flow for obtaining access tokens.

Method 200 may begin at starting block 205 and proceed to stage 210 where identity broker server 125 may receive a plurality of access tokens from a respective plurality of identity provider services. Each of the plurality of access tokens may be associated with user 120. FIG. 3 illustrates a process flow 300 for obtaining access tokens. For example, using user device 115, user 120 may sign up to a service containing an identity broker and may select an initial identity provider service from a list provided by identity broker server 125 (stage 302 of FIG. 3). Identity broker server 125 may then redirect user 120 to identity provider server 130 by providing user 120 with a redirect Uniform Resource Locator (URL) (stage 304 of FIG. 3). User 120 may then open the redirect URL (stage 306 of FIG. 3). In response to user 120 opening the redirect URL, identity provider server 130 may present an authorization user interface to user 120 on user device 115 (stage 308 of FIG. 3). User 120 may then input authorization data into the user interface and submit the entered authorization data to identity provider server 130 (stage 310 of FIG. 3). In response, identity provider server 130 may provide user device 115 with a redirect web proxy with an authorization code (stage 312 of FIG. 3). User device 115 may follow the redirect web proxy to identity broker 125 (stage 314 of FIG. 3). In response, identity broker 125 may present the authorization code to identity provider server 130 (stage 316 of FIG. 3) that may return an access token and a refresh token to identity broker 125. The user may repeat the process flow for obtaining access tokens (and refresh tokens) of FIG. 3, but with different identity provider services of the plurality of identity provider services in order to obtain the plurality of access tokens from the respective plurality of identity provider services.

Figure 4:
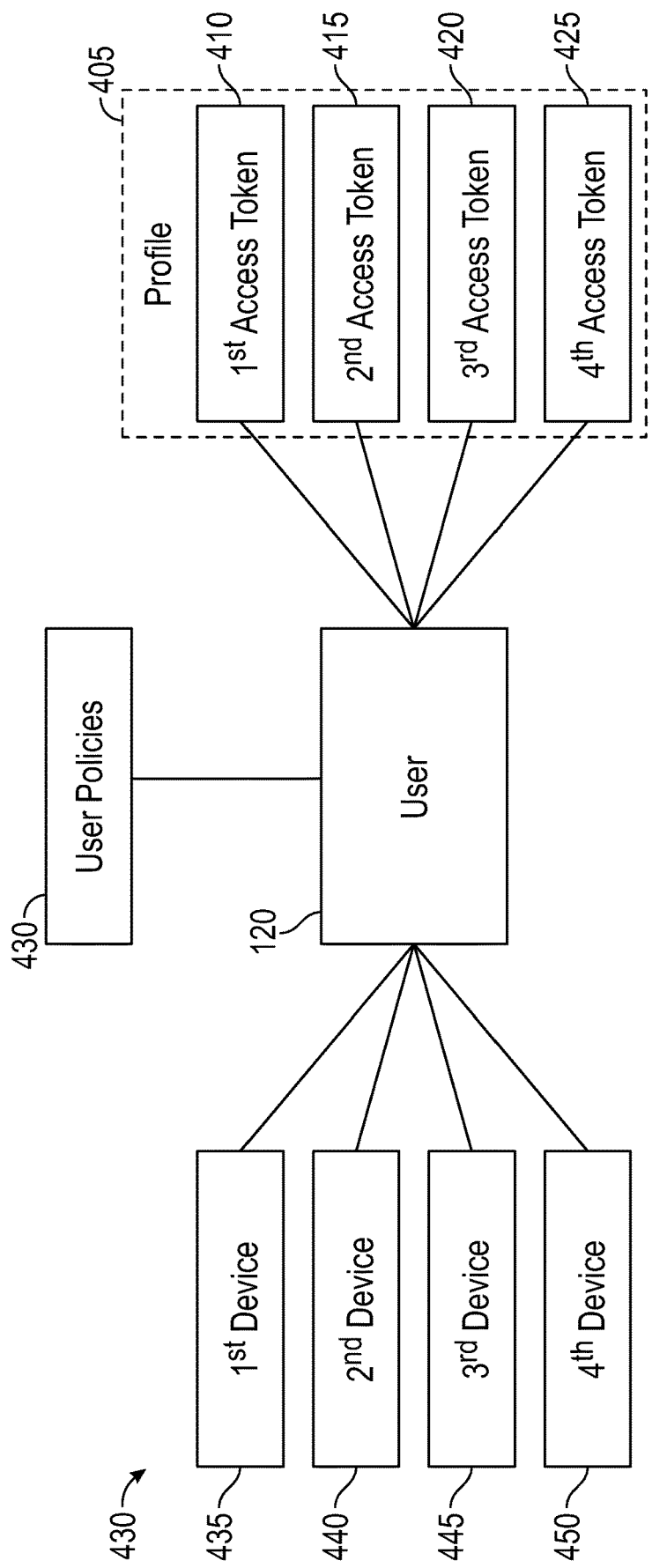
FIG. 4 is a block diagram illustrating a profile.

From stage 210, where identity broker server 125 receives the plurality of access tokens from the respective plurality of identity provider services, method 200 may advance to stage 220 where identity broker server 125 may store the plurality of access tokens in a profile associated with user 120. FIG. 4 is a block diagram illustrating a profile 405. For example, user 120 may repeat the process flow of FIG. 3 multiple times to build up a more complete identity profile 405. The process flow of FIG. 3, for example, may be repeated four times to build up the plurality of access tokens comprising a first access token 410, a second access token 415, a third access token, 420, and a fourth access token 425 as illustrated by FIG. 4. Profile 405 may store user 120's access tokens for the corresponding plurality of identity provider services in user 120's profile 405. Profile 405 may contain access and refresh tokens that may enable identity broker service 125 to authenticate user 120 leveraging a specific identification and possibly provide access to profile information for that specific identification.

Once identity broker server 125 stores the plurality of access tokens (e.g., first access token 410, second access token 415, third access token 420, and fourth access token 425) in profile 405 associated with user 120 in stage 220, method 200 may continue to stage 230 where identity broker server 125 may assign user 120's polices 430 associated with the use of the plurality of access tokens. For example, user 120 may have a set of identity attestations (e.g., the plurality of access tokens from various identity provider services) that may be combined into profile 405. Policies 430 may now be assigned as to which of (or combination thereof) the attestations may be provided to which types of services, and which personal attributes may be shared with whom. Accordingly, authentication in this case may not happen against a certain identity, but may happen against the entirety of user 120's profile 405, with the associated identity attestations and policies 430.

After identity broker server 125 assigns user 120's polices 430 associated with the use of the plurality of access tokens in stage 230, method 200 may proceed to stage 240 where identity broker server 125 may provide a device token to user device 115 associated with user 120. The device token may be associated with profile 405. For example, user 120 may now delegate trust to one or more of user 120's devices 430 (a first device 435, a second device 440, a third device 445, and a fourth device 450) based on profile 405. User device 115 may comprise any one of first device 435, second device 440, third device 445, and fourth device 450. Trust may be delegated by generating the device token tied to user 120's profile 405 and providing the device token to user device 115. User device 115 having the device token may indicate that user device 115 is trusted by user 120 and attached to profile 405 of user 120. The device token may be securely downloaded to user device 115 and may be used for authentication of network services for user device 115, mapping to user 120's profile 405.

Figure 5:
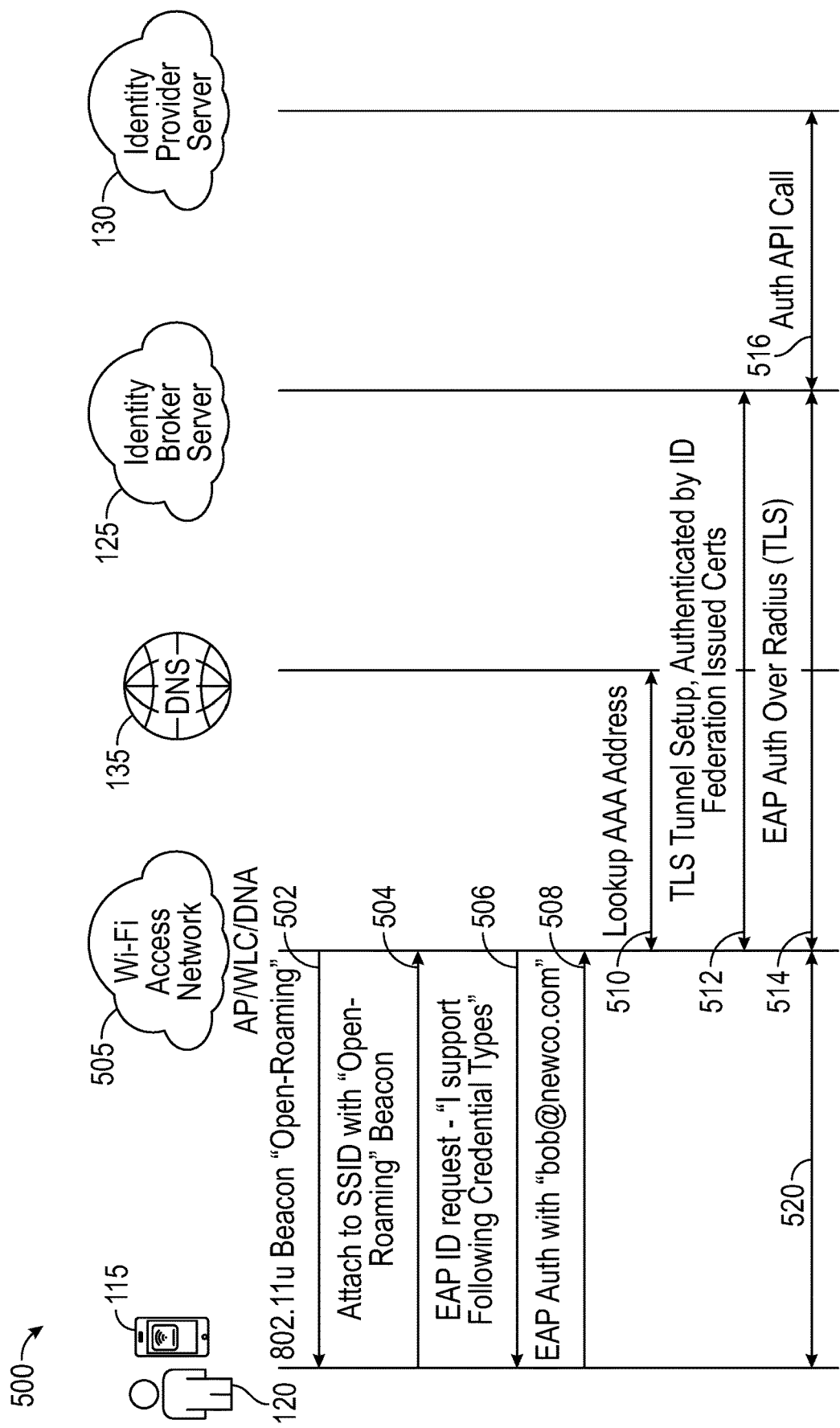
FIG. 5 illustrates a process flow for providing authentication.

After profile 405 is created, seamless authentication to an identity broker service may be provided. FIG. 5 illustrates a process flow 500 for providing authentication. While FIG. 5 may illustrate authentication to a Wi-Fi network, other types of wireless networks may be used consistent with embodiments of the disclosure. Consistent with embodiments of the disclosure, when user 120 attempts to authenticate a service (e.g., a wireless service) with user 120's device token, the identity broker service may understand that user device 115 belongs to user 120 (e.g., by the device token that is presented). Consequently, the identity broker service may try to authenticate to the wireless service based on user 120's profile 405 and policies by leveraging the attestations of identity made at the time user 120 enrolled one or more web identities into profile 405. Accordingly, no passwords or other interaction may be required of user 120, thus a seamless experience may be provided.

From stage 240, where identity broker server 125 provides the device token to user device 125 associated with user 120, method 200 may advance to stage 250 where identity broker server 125 may receive the device token and network policies. For example, subsequent to profile 405 being created and the device token being distributed as described above, user 120 (with user device 115) may walk into the coverage area of an access device (e.g., similar to access device 105 described above) belonging, for example, to a Wi-Fi access network 505 controlled by an enterprise (e.g., a retail store). User device 115 may attempt to attach to network 505 with its device token. As shown in FIG. 5, network 505 may send a beacon or message to the device that indicates support for the service to user device 115 (stage 502 of FIG. 5). In response, user device 115 may attach to a network or service (in the Wi-Fi context, a Service Set Identifier (SS ID)) with said beacon (stage 504 of FIG. 5). Next, network 505 may send an Identity request (in the WiFi context this is an EAP identity request) to user device 115 (stage 506 of FIG. 5) stating which credentials network 505 may support. User device 115 may respond with appropriate credentials (in the WiFi context, an EAP authorization including the supported credentials) (stage 508 of FIG. 5). Network 505 may then look up the address of identity broker server 125 with DNS 135 (stage 510 of FIG. 5). A secure communications tunnel (e.g. Transport Layer Security (TLS) tunnel authenticated by the ID federation certificates) may then be setup between network 505 and identity broker server 125 (stage 512 of FIG. 5). Identity broker server 125 may receive the device token and network policies in a message over said secure tunnel (in the Wi-Fi context this is an EAP message over the TLS tunnel) (stage 514 of FIG. 5).

Once identity broker server 125 receives the device token and network policies in stage 250, method 200 may continue to stage 260 where identity broker server 125 may determine that user polices 430 and the network policies are congruent. For example, the policies of network 505 may indicate that network 505 trusts both a first identity provider service and a second identity provider service, but not a third identity provider service as authentication sources. The policies of network 505 may also indicate that if user 120 provides an email address, user 120 may receive a premium experience. User polices 430 may indicate that user 120 may provide credentials for any of first identity provider service, second identity provider service, and third identity provider service as authentication sources. User polices 430 may also indicate that user 120 may allow sharing of user 120's email address with retail stores. Accordingly, identity broker server 125 may determine that user polices 430 and the network policies (i.e., the policies of network 505) are congruent.

After identity broker server 125 determines that user polices 430 and the network policies are congruent in stage 260, method 200 may proceed to stage 270 where identity broker server 125 may authenticate, in response to determining that the user polices and the network policies are congruent, to at least one of the plurality identity provider services. For example, identity broker server 125 may check to see if user 120's profile 405 has an authentication token for first identity provider service or second identity provider service, and if so, identity broker server 125 may attempt to authenticate to one of the first identity provider service's or the second identity provider service's API (stage 516 of FIG. 5). Because user 120's profile 405 may allow sharing of an email address with a retail store, user 120's email address may also be retrieved from the first identity provider service or the second identity provider service, and returned to network 505 over the secure tunnel. Accordingly, user device 115 may be allowed to join network 505 and may be given a premium service (stage 520 of FIG. 5).

Consistent with other embodiments of the disclosure, an enterprise network may trust only its own credentials, but to ensure that the user's credentials were not compromised, the enterprise network may also want to check the user's identity by using secondary credentials from either the first identity provider service or the second identity provider service for example. The user may walk onto the enterprise's premise to the network and the user's device may attempt to attach to the enterprise network with its device token. The identity broker server may receive the device token and the enterprise network policies. The identity broker server may check to see if the user has a first identity provider service access token or a second identity provider service access token and authenticates to the enterprise as well as to one of the first identity provider service or the second identity provider service. If the enterprise credential has not been revoked, and one of the first identity provider service credentials or the second identity provider service credentials also matches, the user may be allowed on the enterprise network. Consistent with embodiments of the disclosure, biometric verification may also be added for identity attestation. Once identity broker server 125 authenticates to at least one of the plurality identity provider services in stage 270, method 200 may then end at stage 280.

Figure 6:
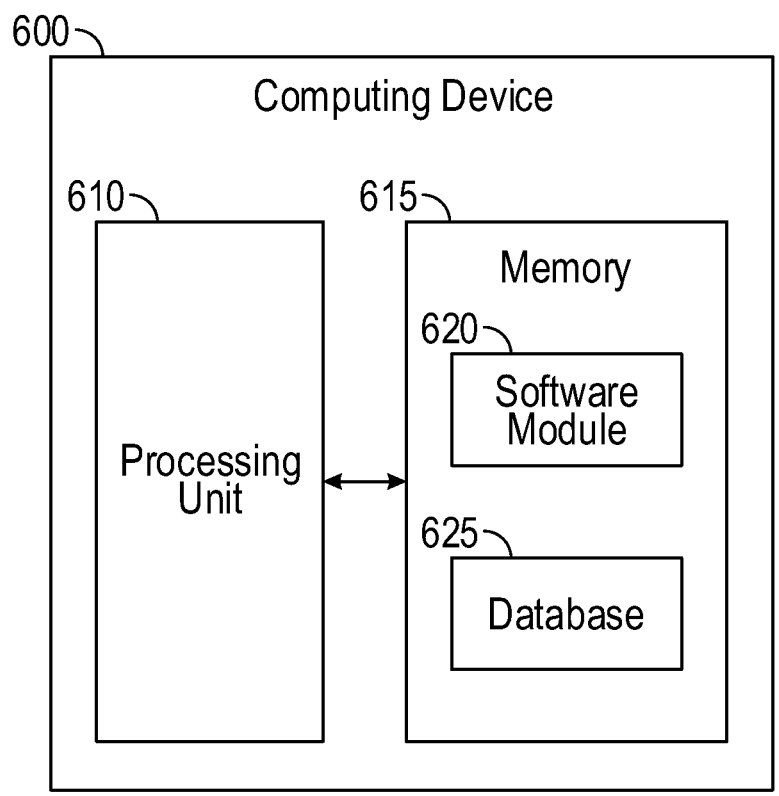
FIG. 6 is a block diagram of a computing device.

FIG. 6 shows computing device 600. As shown in FIG. 6, computing device 600 may include a processing unit 610 and a memory unit 615. Memory unit 615 may include a software module 620 and a database 625. While executing on processing unit 610, software module 620 may perform, for example, processes for providing password-less wireless authentication as described above with respect to FIG. 2. Computing device 600, for example, may provide an operating environment for access device 105, user device 115, identity broker server 125, identity provider server 130, and domain name server 135. Access device 105, user device 115, identity broker server 125, identity provider server 130, and domain name server 135 may operate in other environments and are not limited to computing device 600.

Computing device 600 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by a computing device, a plurality of access tokens from a respective plurality of identity provider services, each of the plurality of access tokens being associated with a user;
   storing the plurality of access tokens in a profile associated with the user;
   assigning user policies associated with use of the plurality of access tokens;
   providing a device token to a user device associated with the user, the device token being tied to the profile;
   receiving the device token and network policies; and
   determining that the user polices policies and the network policies are congruent.

2. The method of claim 1, wherein receiving the plurality of access tokens further comprises receiving a plurality of respective and corresponding refresh tokens.

3. The method of claim 2, further comprising storing the plurality of refresh tokens in the profile associated with the user.

4. The method of claim 2, further comprising using the refresh tokens to refresh the plurality of access tokens.

5. The method of claim 1, wherein receiving the device token and the network policies comprises receiving the device token and the network policies in response to the user device attempting to attach to a network using the device token.

6. The method of claim 1, further comprising authenticating, in response to determining that the user policies and the network policies are congruent, to at least one of the plurality identity provider services.

7. A system comprising:
   a memory storage; and
   a processing unit coupled to the memory storage, wherein the processing unit is operative to:
      receive a device token and network policies,
      determine that user policies and the network policies are congruent, and
      authenticate, in response to determining that the user policies and the network policies are congruent, to at least one of a plurality identity provider services.

8. The system of claim 7, wherein the processing unit being operative to receive the device token and the network policies comprises the processing unit being operative to receive the device token and the network policies in response to the user device attempting to attach to a network using the device token.

9. The system of claim 7, wherein the processing unit is further operative to:
   receive a plurality of access tokens from a respective plurality of identity provider services, each of the plurality of access tokens being associated with a user;
   store the plurality of access tokens in a profile associated with the user;
   assign the user policies associated with use of the plurality of access tokens; and
   provide the device token to a user device associated with the user, the device token being associated with the profile.

10. The system of claim 9, wherein the processing unit being operative to receive the plurality of access tokens further comprises the processing unit being operative to receive a plurality of respective and corresponding refresh tokens.

11. The system of claim 10, wherein the processing unit is further operative to store the plurality of refresh tokens in the profile associated with the user.

12. The system of claim 10, wherein the processing unit is further operative to use the refresh tokens to refresh the plurality of access tokens.

13. The system of claim 7, wherein the processing unit being further operative to authenticate, in response to determining that the user policies and the network policies are congruent, to at least one of the plurality identity provider services.

14. The system of claim 7, wherein the system comprises an identity broker server.

15. A non-transitory computer-readable medium that stores a set of instructions which when executed perform a method executed by the set of instructions comprising:
   receiving, by a computing device, a plurality of access tokens from a respective plurality of identity provider services, each of the plurality of access tokens being associated with a user;
   storing the plurality of access tokens in a profile associated with the user;
   assigning user policies associated with use of the plurality of access tokens;
   providing a device token to a user device associated with the user, the device token being associated with the profile;
   receiving the device token and network policies; and
   determining that the user policies and the network policies are congruent.

16. The non-transitory computer-readable medium of claim 15, wherein receiving the plurality of access tokens further comprises receiving a plurality of respective and corresponding refresh tokens.

17. The non-transitory computer-readable medium of claim 16, further comprising storing the plurality of refresh tokens in the profile associated with the user.

18. The non-transitory computer-readable medium of claim 16, further comprising using the refresh tokens to refresh the plurality of access tokens.

19. The non-transitory computer-readable medium of claim 15, wherein receiving the device token and the network policies comprises receiving the device token and the network policies in response to the user device attempting to attach to a network using the device token.

20. The non-transitory computer-readable medium of claim 15, further comprising authenticating, in response to determining that the user policies and the network policies are congruent, to at least one of the plurality identity provider services.

* * * * *